United States Patent [19]

Heinemann et al.

[11] Patent Number: 4,640,356
[45] Date of Patent: Feb. 3, 1987

[54] PROCESS FOR THE ENHANCED OIL RECOVERY OF UNDERGROUND MINERAL OIL DEPOSITS

[75] Inventors: Zoltan Heinemann, Leoben; Heinz König, Linz, both of Fed. Rep. of Germany

[73] Assignee: Chemie Linz Aktiengesellschaft, Linz, Austria

[21] Appl. No.: 700,630

[22] Filed: Feb. 12, 1985

[30] Foreign Application Priority Data

Feb. 14, 1984 [DE] Fed. Rep. of Germany ....... 3405201

[51] Int. Cl.⁴ .................. E21B 33/138; E21B 43/24
[52] U.S. Cl. ................... 166/272; 166/288; 166/294
[58] Field of Search .............. 166/272, 288, 294, 303

[56] References Cited

U.S. PATENT DOCUMENTS

| | | | |
|---|---|---|---|
| 1,379,657 | 5/1921 | Swan | 166/288 |
| 2,779,415 | 1/1957 | Howard | 166/288 X |
| 2,779,416 | 1/1957 | Clark, Jr. | 166/288 X |
| 2,799,341 | 7/1957 | Maly | 166/303 X |
| 2,903,065 | 9/1959 | Holbrook et al. | 166/288 X |
| 3,344,859 | 10/1967 | Bucaram | 166/288 X |
| 3,369,603 | 2/1968 | Trantham | 166/288 X |
| 3,373,814 | 3/1968 | Eilers et al. | 166/288 |
| 3,412,793 | 11/1968 | Needham | 166/272 |
| 3,601,195 | 8/1971 | Hearn | 166/288 |
| 3,732,926 | 5/1973 | Brown et al. | 166/272 |
| 3,837,401 | 9/1974 | Allen et al. | 166/303 |
| 3,993,133 | 11/1976 | Clampitt | 166/272 |
| 3,994,345 | 11/1976 | Needham | 166/303 |
| 4,068,717 | 1/1978 | Needham | 166/272 |
| 4,085,800 | 4/1978 | Engle et al. | 166/288 |
| 4,192,755 | 3/1980 | Fluornoy et al. | 166/275 X |
| 4,232,741 | 11/1980 | Richardson et al. | 166/281 |
| 4,250,963 | 2/1981 | Hess | 166/288 |
| 4,300,634 | 11/1981 | Clampitt | 166/272 |
| 4,444,261 | 4/1984 | Islip | 166/288 X |

FOREIGN PATENT DOCUMENTS 1080614 7/1980 Canada.

Primary Examiner—George A. Suchfield
Attorney, Agent, or Firm—Mark Dryer

[57] ABSTRACT

A process for the enhanced oil recovery of underground mineral oil deposits, in which one or more substances which are scarcely water- and oil-soluble at deposit temperature but are well soluble or volatile in the hot flooding medium and whose melting point lies above the deposit temperature, are added to the flooding medium hot water and/or steam. They move with the hot flooding medium through the deposit and precipitate as a solid preferably at that part of the temperature front which is advancing fastest, thereby constricting the pores of the deposit temporarily and reversibly, until the solid is dissolved or evaporated again by repeated flow of the hot flooding medium, which has the overall effect of an areal and vertical equalization of the temperature front.

4 Claims, 1 Drawing Figure

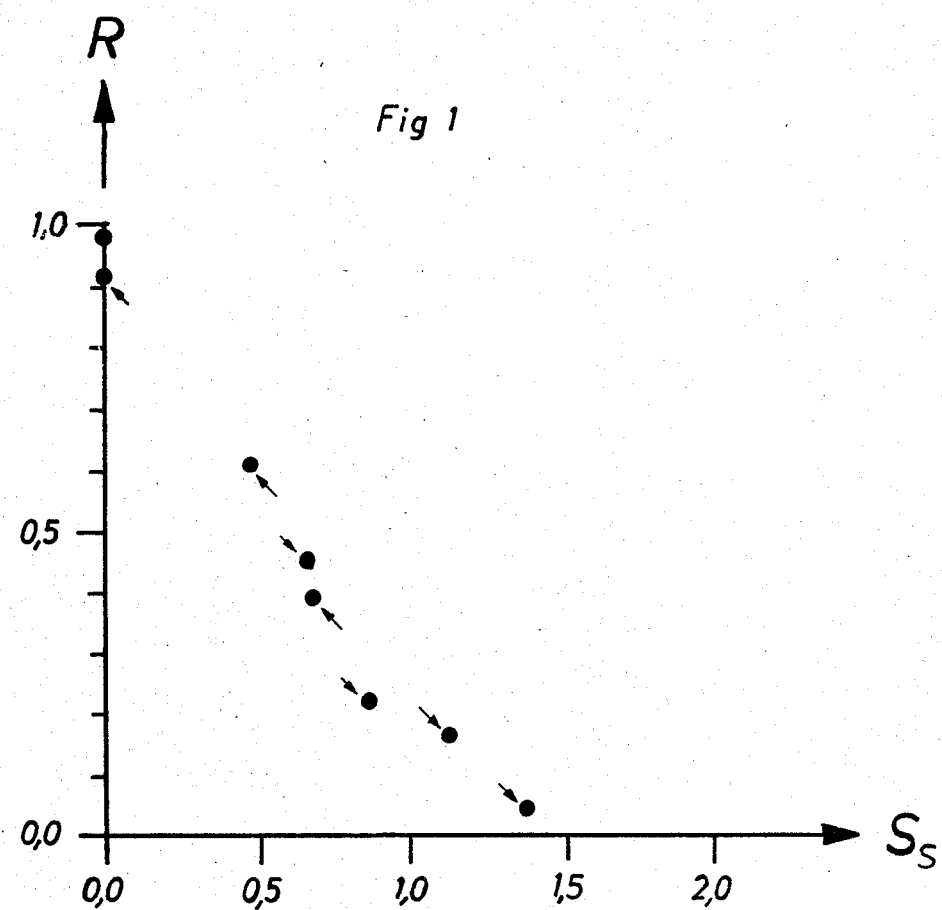

PROCESS FOR THE ENHANCED OIL RECOVERY OF UNDERGROUND MINERAL OIL DEPOSITS

BACKGROUND OF THE INVENTION

The invention relates to a process for the enhanced oil recovery of underground mineral oil deposits by selective, reversible reduction of the permeability in hot-water and/or steam flooding.

Steam flooding and hot-water flooding are thermal EOR processes (EOR=Enhanced Oil Recovery) for the winning of mineral oil from deposits and are used predominantly for the production of relatively heavy oils or tars. In order to achieve a good ultimate recovery, the ratio M of the mobility of the flooding medium (steam or water) to the oil mobility must be lowered. This is performed in steam flooding and in hot-water flooding by heating up the deposit utilizing the heat content of the flooding media. Since the oil viscosity usually drops more under a temperature increase than the viscosity of the flooding media, the mobility ratio M improves and an increase in the ultimate oil recovery of the deposit is thereby achieved.

In the ideal case of steam or hot-water flooding, the heated zone spreads evenly in the deposit and the flooding medium displaces the oil evenly to the production wells. However, in practice this is never the case as deposits are not homogeneous and consist of beds having different properties and which may be separated from one another by impermeable embedments. Channels are produced, in which part of the flooding medium advances faster and reaches the production well prematurely. This is to be prevented, for example according to U.S. Pat. No. 4,250,963 by the steam being accompanied by a monomer, eg. styrene, which condenses at the temperature front and, at a temperature below about 120° C., polymerizes to form a polystyrene. The disadvantage of this and many similar polymerization methods lies in the fact that the polymerization is irreversible, meaning that the deposit remains blocked for ever more at this point.

According to U.S. Pat. No. 4,232,741, a very complicated process utilizing a nitrogen-generating substance, a surface-active substance, a pH control system and an acid-liberating substance is used to produce a foam at a desired point of the underground formation, likewise blocking the formation. Apart from the fact that it is very difficult to instigate such a complicated process at a very precise point in a largely unknown underground formation, the foam formation causes irreversible blocking, which lasts as long as the foam exists. After decomposition of the foam, the formation is permeable again at this point and channel formation can occur again.

Another reason for channel formation, and thus for inadequate oil recovery of the deposit lies in the fact that steam has a substantially lower density than oil and the tongue of steam therefore has a propensity to move into the upper part of the deposit bed and to reach the production well in the form of a narrow finger. According to Canadian Patent Specification No. 1,080,614, this is to be prevented by separating the injected steam, which usually contains a greater or lesser proportion of water, into a gaseous and a liquid phase, and introducing the liquid phase into the formation above the gaseous phase. Apart from the additional expenditure on equipment, here too the gas phase has the propensity to drift upwards and compete with the liquid phase, and the bottom part of the deposit is again avoided by the flooding medium. If the deposit is inhomogeneous, and this inhomogeneity cannot be predicted, as is normally the case, the gas phase forms unforeseen fingers and again runs ahead of the liquid phase with the formation of channels.

In contrast with this, it has now been possible to discover a process for the oil recovery of underground deposits in which the permeability of an underground formation is reduced selectively at the points of highest permeability and in a reversible form. The reduction in the permeability of the rock for the flooding medium can be equated with a reduction in the ratio M of the mobility of the flooding medium to the oil mobility, which results in an increase in the ultimate oil recovery.

SUMMARY OF THE INVENTION

The subject of the present invention is consequently a process for the enhanced oil recovery of underground mineral oil deposits by selective, reversible reduction of the permeability using hot-water and/or steam flooding, wherein hot water and/or steam is injected, at least at times, into the deposit via one or more injection boreholes, as a flooding medium which contains an active amount of one or more substances scarcely water- and oil-soluble at the temperature of the deposit but well soluble or volatile in hot water and/or steam, the melting point of which lies above the temperature of the deposit and which move with the hot water or the steam through the deposit and which, by precipitation as a solid, temporarily and reversibly constrict the pores of the deposit, preferably at that part of the temperature front which is advancing fastest, until flooding medium flowing on after dissolves or evaporates the solid again, which has the overall effect of an areal and vertical equalization of the temperature front.

In the process according to the invention, a substance having a melting point above the temperature of the deposit, usually above 80° C., which is well soluble in the flooding medium hot water or volatile with the flooding medium steam and is scarcely soluble at the initial temperature of the deposit, is forced together with the hot flooding medium into the deposit through an injection well and transported up to the temperature front, where it cools, solidifies, ie. usually crystallizes, and reduces the permeability in this region for the flooding medium. In the hot flooding medium flowing on after, the substance dissolves or sublimes according to its physical properties and the flooding medium together with the dissolved or evaporated substance drifts further until the substance again precipitates at the temperature front. The precipitation of the substance as a solid and the accompanying reduction in the permeability for the flooding medium is temporary and reversible; a constant alternation between precipitation and re-dissolution or evaporation in the flooding medium takes place in the deposit, the flooding medium each time transporting a supply of substance to the temperature front.

The ultimate oil recovery is made up of the volumetric flooding efficiency $E_v$ effective over a large area and the degree of displacement $E_d$ effective locally. First of all, the physical processes will be described which result in the increase in flooding efficiency from the measures according to the invention.

If, for one of the reasons mentioned above, the flooding medium forms a channel or finger, not only does more flooding medium move forward in this finger than in the more slowly flooded part of the deposit, but the finger also contains more substance since the substance is brought on with the flooding medium and the flooding medium advances substantially faster than the temperature front. The more substance precipitates at the temperature front, the greater the reduction in the permeability, the smaller the speed of the flooding medium and the less heat is available for heating up the part of the deposit concerned and thus for advancing the temperature front in this part. In this part of the deposit, the rapid advance of the temperature front is slowed by the measure according to the invention. Those other parts of the deposit, which lie beyond the main directions of flow either because they have from the outset a lower permeability or because they lie unfavorably in view of the arrangement of the well, have however also advanced in the meantime, although at a correspondingly lower rate. They have been given the opportunity of catching up, so that there is overall an equalization in the speed of the front in a self-regulating process.

Similar to this effect occuring over a large area, which increases the volumetric flooding efficiency $E_v$, by also including and recovering the oil from those parts of the deposit which are otherwise not reached by the flooding medium, an increase in the degree of oil displacement $E_d$ can also occur locally in the pore channels. This local effect is predominantly demonstrable in hot-water flooding, where the relatively poor, low degree of displacement can be considerably improved. It is known that, when two phases, water and oil, flow next to each other in the deposit rock, some of the possible flow paths, the so-called pore channels, are oil-carrying, some are water-carrying. In the process according to the invention, the hot flooding medium, together with the dissolved or evaporated substance, first likewise moves in the water-carrying pore channels; however, as it is just these water-carrying pore channels which are constricted upon cooling at the temperature front due to precipitation of solid substance, the hot flooding medium is forced to divert to oil-containing pore channels and to recover the oil from these as well. Thus the degree of displacement $E_d$ is also increased. Flooding medium flowing on after takes up the solid again and transports it further.

The flooding medium in the process according to the invention can be either hot water or steam or a mixture of the two. Hot water usually has an injection temperature of about 80° to 300° C., preferably of about 150° to 250° C., steam an injection temperature of about 110° to 380° C., preferably of about 200° to 350° C., mixtures of hot water and steam usually an injection temperature of about 150° to 350° C., mixtures of steam and condensate or wet steam of various quality being possible. The expressions "water" and "hot water" used in the present description cover both water droplets carried with the steam and steam condensate, fresh water and water of all solinity degrees as occur in deposits (0 to 300 kg salt/m³).

If the aim is to reduce the permeability for the flooding medium hot water, a substance is used which has a low solubility in cold water, in particular a solubility of less than 3 kg/m³ water at 20° C. and good solubility in hot water, in particular a solubility of more than 5 kg/m³ water at 200° C. and a low oil solubility, in particular of less than 3 kg/m³ oil at 20° C. Its melting point is above the temperature of the deposit, usually above 80° C., in particular above 150° C., and under deposit conditions it is adequately stable both thermally and chemically.

Examples of such hot-water soluble substances are rigid, aromatic polyhydroxylated compounds, such as for example 2,6-dihydroxynaphthalene or 1,5-dihydroxynaphthalene, substituted or non-substituted bis-, tris- or tetra-p-hydroxyphenylalkane or alkene or their derivatives, such as for example leucoaurin(tris-(p-hydroxyphenyl)methane), or sparingly soluble aminoacids, such as for example tyrosine, particularly preferred is 1,5-dihydroxynaphthalene.

If the aim is to reduce the permeability for the flooding medium steam, a substance is used whose melting point is likewise above the temperature of the deposit, usually above 120° C., in particular above 200° C., and which is in a gaseous state to an extent, at this temperature appropriate to its vapor pressure. At 300° C., it has, for instance, a vapor pressure of above 0.01 bar, in particular above 0.03 bar, likewise it has low solubility in cold water and in oil and adequate thermal and chemical stability under deposit conditions. Examples of such sublimable compounds are polynuclear compounds of rigid molecular structure, such as for example 9,10-anthraquinone or acridone.

The process according to the invention can be used both in oil displacement by means of hot water with a hot-water soluble substance and in oil displacement by means of steam with a steam-volatile substance. Since, in steam flooding, usually wet steam is injected, it is also possible to introduce both a volatile substance and a substance soluble in the hot water fraction of the wet steam as well as both substances together or successively. The volatile substance exerts its permeability-reducing effect during the transition from the gaseous to the solid state at the condensation front of the steam, while the hot-water soluble substance precipitates at the transition from hot water zone to cold water zone until it is again dissolved by the following hot water and transported further, the hot water partly originating from the water of the wet steam, partly having been formed by condensation of the vapor phase and also being able to contain proportions of injection water and deposit water.

The process according to the invention has the effect in hot-water flooding both of improvement in the flooding efficiency $E^v$ and of improvement in the degree of displacement $E_d$, and in steam flooding, where there is above all the danger of tongue formation and of overriding, the formation of a steam channel in the upper part of a thick bed, above all of an improvement in the volumetric flooding efficiency $E_v$. The process according to the invention can be used in the case of oil deposits which are suitable for thermal oil recovery processes, in particular in the case of oils having a density of between 11° and 25° API, a viscosity of between 20 and 100,000 mPas, a porosity of the deposit rock of over 15% and a permeability of above $0.05 \cdot 10^{-12}$ m².

Since the temperature front moves toward the production well substantially slower than the front of the flooding medium, the process is possible both at the start of a flooding process and during the course of such flooding processes by sending on substance.

The substance is introduced with the flooding medium at a concentration of about 0.0002 to 0.3 kg substance/kg flooding medium. If the substance is introduced continuously, the concentration is about 0.0002 to 0.05 kg substance/kg flooding medium, if it is introduced discontinuously to achieve a build-up of substance supply, the concentration is about 0.002 to 0.3 kg substance/kg flooding medium. It can also be introduced in the form of a saturated solution.

The reduction in permeability according to the invention is expressed by the reduction factor R, the ratio of the permeability after substance saturation to the initial permeability.

BRIEF DESCRIPTION OF THE DRAWING

The accompanying drawing is a graph illustrating the relationship between the reduction factor, R, and the saturation of solid substance in one pore volume, $S_s$.

The amount of substance necesssary in implementation of the process to achieve the permeability reduction is small. It can be seen from Example 1, Table 2, that, in the case of substance A at a substance saturation of just 0.64% of pore volume (PV), the reduction factor is 0.45, at a substance saturation of 0.84% PV, the reduction factor is 0.22, and at a substance saturation of 1.37% of PV, the reduction factor is 0.04. This means that the precipitation of substance A as a solid amounting to just 0.64% of pore volume is adequate to reduce the permeability to about half (0.45). If 0.84% PV are filled with substance, the permeability is then only 22% and if 1.37% PV are filled with substance, the permeability is then only 4% of the initial value.

Example 2 shows that the permeability is likewise reduced by using a substance sublimable with steam. While in the test without substance the pressure difference dropped due to the lower viscosity of the steam compared with water, and after 1.8 PV was no longer measurable, in the test according to the invention, with precipitation of substance B in the pore space, the pressure difference between core entry and core exit became ever greater and the permeability of the rock for the steam phase was lowered. For the deposit, a permeability reduction for the steam phase means a reduction in the mobility ratio M, which has the effect above all of an increase in the flooding efficiency over a large area.

While Examples 1 and 2 state that substances can be introduced into a deposit rock and reduce the permeability there for the water or steam phase, Examples 3 and 4 show that the permeability reduction in the deposit is reversible; the precipitated substance can be dispelled again and transported further. The reduction factors R found in Example 3 in the partial elution of substance A at 100° C., are compiled in Table 5 and, as the drawing illustrates, lie within measuring accuracy on the same curve as the reduction factors found in Example 1, Table 2, in saturation with substance A. Example 4 shows that, after flooding with 1.4 PV water at 174° C., the reduction factor is 0.92, and the substance A dissolved completely and could be removed from the drill core. This deviation of the reduction factor from the theoretical value 1 is explained on the one hand by the measuring tolerance and on the other hand by possible structural changes in the drill core due to swelling or shrinking processes of the clay minerals.

Examples 5 and 6 show that, by hot-water flooding using the process according to the invention, a reduction in permeability and an increased oil recovery takes place even when oil occurs in the deposit rock. As revealed by Tables 8 and 10, the degree of oil displacement $E_d$ in conventional hot-water flooding without substance addition is 0.34, 0.35 and 0.33, in flooding according to the invention with substance A is 0.46, 0.42 and 0.42, in flooding according to the invention with substance C is 0.46 and 0.49 and in flooding according to the invention with substance D is 0.45 and 0.47. This signifies a considerable increase in oil recovery both when using substance A and when using substances C and D. While an improvement in the flooding efficiency $E_v$ over a large area due to the permeability reduction and the resultant improvement in the mobility ratio M can be deduced, the part played by the degree of displacement $E_d$ in the increased oil recovery can be demonstrated directly in the flooding installation.

Example 7 shows that in steam flooding of oil-containing drill cores with a substance effective in the vapor phase, utilizing the process according to the invention, the pressure difference between core entry and core exit compared with the comparison test was substantially increased. This increased pressure difference corresponds to a reduced permeability and thus to an increased flooding efficiency $E_v$ over a large area in the deposit, which cannot be manifested in a small drill core, but can only be demonstrated in a field trial. The oil recovery data in Table 11 show that there were no adverse effects on the other components of the overall ultimate oil recovery, namely on the degree of displacement $E_d$, by introducing vaporous substance B.

EXAMPLE 1

Reduction in permeability in aqueous phase

For the flooding tests, cylindrically cut drill cores of Valendis sandstone having a porosity of about 23%, a permeability in the range of 0.9 to $2.5 \cdot 10^{-12}$ m$^2$, a diameter of 3.9 cm and a length of 50 cm were used as a model formation. Each core was inserted into a steel tube and cast on both sides with a temperature-resistant cement mix. Flanges were then welded on the ends of the steel tubes. The cores prepared in this way were evacuated, flooded with carbon dioxide, re-evacuated and then saturated with deionized water. The pressure difference between core entry and core exit was measured whilst pumping through deionized water at 20° C. The initial permeability of the core concerned was calculated from this using the Darcy equation.

A core was installed in a compression-resistant, thermostat-controllable flooding facility, which was equipped with a temperature measuring instrument, pressure gauges at the entry and exit and a pressure-maintaining valve, and heated under pressure to a temperature of 150° C. Deionized water was pre-heated in a fluidized-bed heater to 150° C. and pumped through a substance tank at a thermostatically controlled temperature of 150° C. The substance tank contained substance A embedded in glass wool and whose relevant physical data are recorded in Table 1.

TABLE 1

| Substance A: | | | | | | | | | |
|---|---|---|---|---|---|---|---|---|---|
| Chemical composition: | 1,5-dihydroxynaphthalene | | | | | | | | |
| Melting point: | 265° C. | | | | | | | | |
| Density: | $1.50 \cdot 10^3$ kg/m$^3$ | | | | | | | | |
| Solubility in distilled water: | | | | | | | | | |
| Temperature (°C.) | 20 | 60 | 100 | 150 | 160 | 170 | 180 | 200 | 250 |
| Solubility | 0.46 | 1.12 | 2.8 | 10 | 13 | 17 | 21 | 33 | 100 |

TABLE 1-continued

| Substance A: |
|---|
| (kg/m³) |

The solution of substance A, saturated at 150° C., was injected into the core. After the passage of a volume of liquid corresponding at least to one pore volume of the core (1 PV), the injection was interrupted and the core cooled to 20° C. Consequently, the precipitation of the substance in solid form in the pore space was initiated and the desired saturation of the pore space with substance A produced. Finally, the permeability was again determined at 20° C. The reduction in permeability according to the invention is expressed by the reduction factor R, the ratio of the permeability after substance saturation to the initial permeability. The same procedure was repeated with other, but similar cores at 160° C., 170° C. and 180° C. with solutions of substance A saturated at these temperatures. For comparison, a flood test was also carried out without substance A, using pure water at 150° C.

The results are compiled in Table 2. The amount of solid substance left in 1 PV (saturation $S_s$ in percentages by volume) is obtained from the difference in solubility of the substance before and after cooling.

TABLE 2

| Reduction in permeability as a function of the saturation of rock pores with substance A | | | | | |
|---|---|---|---|---|---|
| Substance | none | A | A | A | A |
| Flooding temperature (°C.) | 150 | 150 | 160 | 170 | 180 |
| Flooding volume (PV) | 1.2 | 1.2 | 1.1 | 1.1 | 1.0 |
| Cooling time (h) | 24 | 50 | 24 | 20 | 48 |
| Initial permeability measurement: | | | | | |
| Injection rate ($m^3 s^{-1} \cdot 10^{-9}$) | 49.4 | 47.2 | 48.6 | 28.1 | 50.0 |
| Differential pressure (bar) | 0.14 | 0.08 | 0.14 | 0.10 | 0.09 |
| Permeability ($m^2 \cdot 10^{-12}$) | 1.48 | 2.47 | 1.45 | 1.17 | 2.32 |
| Permeability measurement after saturation: | | | | | |
| Injection rate ($M^3 s^{-1} \cdot 10^{-9}$) | 48.6 | 50.0 | 33.3 | 28.3 | 33.3 |
| Differential pressure (bar) | 0.14 | 0.19 | 0.44 | 0.65 | 1.35 |
| Permeability ($m^2 \cdot 10^{-12}$) | 1.45 | 1.10 | 0.32 | 0.18 | 0.10 |
| Reduction factor R | 0.98 | 0.45 | 0.22 | 0.16 | 0.04 |
| Saturation $S_s$ (% PV) | 0 | 0.64 | 0.84 | 1.10 | 1.37 |

PV: Pore volume
Reduction factor R: Ratio of permability after substance saturation to initial permeability
Saturation $S_s$: Saturation with substance in % of PV

EXAMPLE 2

Reduction in permeability in the steam phase

Drill cores of 6 cm diameter and 60 cm length composed of the Valendis sandstone described in Example 1 were used as core material. The cores installed in steel tubes were evacuated, flooded with carbon dioxide, re-evacuated and then saturated with deionized water. Deionized water was pumped at a constant rate into the fluidized-bed heater of the flooding facility. Saturated steam of 275° C. was produced by evaporation. The substance tank contained sublimable substance B, embedded in glass wool. The relevant physical data of substance B are recorded in Table 3.

TABLE 3

| Substance B: | |
|---|---|
| Chemical composition: | 9,10-anthraquinone |
| Melting point: | 286° C. |
| Density: | $1.44 \cdot 10^3$ kg/m³ |
| Temperature (°C.) | 100  180  200  220  245  275 |

TABLE 3-continued

| Substance B: | |
|---|---|
| Vapor pressure (mbar) | 0.002  0.73  2.4  6.7  23  85 |

The saturated steam, saturated with substance B at 275° C., emerging from the substance tank was injected into the drill core. The changes in the pressure difference between core entry and core exit, which represents a measure of the permeability, were recorded.

For comparison, an analogous test was carried out without substance B, but otherwise under the same conditions.

The results are shown in Table 4.

TABLE 4

| Reduction in permeability of the rock for steam | | |
|---|---|---|
| Substance | none | B |
| Temperature (°C.) | 275 | 275 |
| Injection rate ($m^3 \cdot s^{-1} \cdot 10^{-9}$) | 18.1 | 18.2 |
| Speed of the steam front ($m \cdot s^{-1} \cdot 10^{-6}$) | 13.6 | 13.9 |
| Transport capacity of the steam (kg/kg) | — | 0.0127 |
| Saturation with substance $S_s$ (% PV) | — | 1.9 |
| Pressure difference (bar) as a function of injection volume: | | |
| 0.5 PV | 0.06 | 0.07 |
| 0.8 PV | 0.05 | 0.08 |
| 1.0 PV | 0.03 | 0.08 |
| 1.2 PV | 0.02 | 0.08 |
| 1.5 PV | 0.01 | 0.12 |
| 1.8 PV below | 0.01 | 0.22 |

EXAMPLE 3

Reversibility of the permeability reduction

The drill core, which in Example 1 was treated at 160° C. with solution of substance A saturated at this temperature and then cooled, was flooded with hot water of 100° C. After each flooding volume of 1 PV, the system was cooled to 20° C., the pressure difference during the flowing-through with water of 20° C. was measured and the permeability calculated from it. The reduction factor after the partial elution is obtained as a ratio of the last-found permeability to the initial permeability.

The results are compiled in Table 5.

TABLE 5

| Flooding volume (PV water) | 0 | 1 | 2 |
|---|---|---|---|
| Flooding temperature (°C.) | — | 100 | 100 |
| Initial permeability ($m^2 \cdot 10^{-12}$) | 1.45 | 1.45 | 1.45 |
| Injection rate ($m^3 \cdot s^{-1} \cdot 10^{-9}$) | 33.3 | 33.3 | 33.3 |
| Pressure difference (bar) | 0.44 | 0.25 | 0.16 |
| Permeability ($m^2 \cdot 10^{-12}$) | 0.317 | 0.558 | 0.872 |
| Reduction factor R | 0.22 | 0.38 | 0.60 |
| Saturation $S_s$ (% PV) | 0.84 | 0.65 | 0.46 |

EXAMPLE 4

Complete reversibility of the permeability reduction

The drill core which in Example 1 was treated at 170° C. with solution of substance A saturated at this temperature and then cooled, was flooded with 1.4 PV water at 174° C. Then the permeability was determined at 20° C.

The results are compiled in Table 6.

TABLE 6

| Flooding volume (PV water) | 0 | 1.4 |
|---|---|---|
| Flooding temperature (°C.) | — | 174 |
| Initial permeability ($m^2 \cdot 10^{-12}$) | 1.17 | 1.17 |
| Injection rate ($m^3 \cdot s^{-1} \cdot 10^{-9}$) | 28.3 | 28.3 |
| Pressure difference (bar) | 0.65 | 0.11 |
| Permeability ($m^2 \cdot 10^{-12}$) | 0.18 | 1.08 |
| Reduction factor R | 0.16 | 0.92 |
| Saturation $S_s$ (% PV) | 1.10 | 0 |

Subsequently, the core was examined for residual substance. No residue of substance A could be demonstrated.

EXAMPLE 5

Oil recovery of drill cores by hot-water flooding

Cylindrically cut drill cores of Valendis sandstone having a porosity of 23%, a permeability of 0.9 to 2.5 $m^2 \cdot 10^{12}$, a diameter of 6 cm and a length of 60 cm were, as described in Example 1, installed in steel tubes, purged with carbon dioxide and saturated with deionized water. Subsequently, they were flooded with crude oil in deposit-similar conditions at 50° C. and an average pressure of 30 to 35 bar. The crude oil had a viscosity of 1,200 mPa.s at 20° C., of 210 mPa.s at 44° C., of 71 mPa.s at 80° C. and a density of 0.938 at 20° C. and of 0.889 at 44° C. An initial oil saturation of 87 to 92% pore volume was reached.

An oil-saturated drill core was installed in each case in a compression-resistant, thermostat-controllable flooding facility. Deionized water was pre-heated at 180° C. in a fluidized-bed heater and pumped through a substance tank thermostatically controlled at 180° C. containing substance A or substance C embedded in glass wool. During flowing through the substance tank, a solution saturated with substance A or substance C was produced, which was injected into the drill core.

The solubility data of substance A have already been recorded in Example 1, Table 1. Table 7 reproduces the relevant physical data of substance C.

TABLE 7

Substance C:
Chemical composition: Tyrosine
Melting point: 317° C.
Density: $1.46 \cdot 10^3$ kg/$m^3$
Solubility in distilled water:

| Temperature (°C.) | 20 | 40 | 60 | 80 | 100 | 180 |
|---|---|---|---|---|---|---|
| Solubility (kg/$m^3$) | 0.3 | 0.68 | 1.4 | 2.7 | 5.0 | 30 |

The progression of the temperature front in the deposit was simulated in the flooding facility in the way now described. At the start of the flooding test, the drill core installed in a steel tube was outside the heating chamber thermostatically controlled at 180° C. and had a temperature of 21° C. During the flooding process, the steel tube with the core was slowly pushed at a constant rate into the heating chamber. The temperature front was in each case at the entry of the heating chamber. The temperature profile was recorded over the entire core length by temperature sensors.

The fluida issuing from the core were collected in a separator and, after the passage of 1.8 to 2.2 PV, the volume of oil produced determined. Table 8 contains the test results of three comparison tests without using a substance, three flooding tests with substance A and two flooding tests with substance C.

TABLE 8

| Improvement in the degree of oil displacement in hot-water flooding | | | | | | | | |
|---|---|---|---|---|---|---|---|---|
| Substance | none | none | none | A | A | A | C | C |
| Initial oil volume ($m^3 \cdot 10^{-6}$) | 3.32 | 3.32 | 3.50 | 3.40 | 3.49 | 3.53 | 3.27 | 3.20 |
| Initial oil saturation $S_{oi}$ | 0.87 | 0.87 | 0.91 | 0.90 | 0.91 | 0.92 | 0.85 | 0.84 |
| Initial core temperature (°C.) | 21 | 21 | 21 | 21 | 21 | 21 | 21 | 21 |
| Flooding temperature (°C.) | 180 | 180 | 180 | 180 | 180 | 180 | 180 | 180 |
| Transport capacity of the hot water (kg/$m^3$) | — | — | — | 20.5 | 20.5 | 20.5 | 29.7 | 29.7 |
| Injection rate ($m^3 \cdot s^{-1} \cdot 10^{-9}$) | 8.58 | 8.48 | 8.56 | 7.94 | 7.92 | 7.67 | 6.58 | 6.89 |
| Front speed ($m \cdot s^{-1} \cdot 10^{-6}$) | 7.08 | 7.25 | 6.94 | 7.08 | 6.94 | 5.56 | 5.58 | 5.28 |
| Calculated substance saturation $S_s$ (% PV) | — | — | — | 2.5 | 2.5 | 3.0 | 3.9 | 4.3 |
| Injection volume (PV) | 1.9 | 1.8 | 1.9 | 1.8 | 1.8 | 2.2 | 1.8 | 1.8 |
| Produced oil volume ($m^3 \cdot 10^{-6}$) | 1.12 | 1.15 | 1.16 | 1.55 | 1.47 | 1.49 | 1.49 | 1.56 |
| Residual oil saturation $S_{or}$ | 0.58 | 0.57 | 0.61 | 0.49 | 0.53 | 0.53 | 0.46 | 0.43 |
| Degree of oil displacement $E_d$ | 0.34 | 0.35 | 0.33 | 0.46 | 0.42 | 0.42 | 0.46 | 0.49 |

EXAMPLE 6

Oil recovery of drill cores by hot-water flooding

Oil recovery tests with substance D were carried out in the way described in Example 5 with the same drill cores and the same crude oil. The test conditions were identical as far as possible with the conditions in Example 5; only the flooding of the drill cores was at a slightly lower average pressure of 20 to 25 bar. Table 8 reproduces the relevant physical data of substance D, Table 10 contains the test results of a comparison test without using a substance and of two flooding tests with subtance D.

TABLE 9

Substance D

| Chemical composition: | 4,4'-dihyroxybiphenyl |
| --- | --- |
| Melting point: | 275° C. |
| Density: | 1.25 |

Solubility in distilled water and in simulated deposit water

| T (°C.) | 20 | 40 | 60 | 80 | 100 | 200 |
| --- | --- | --- | --- | --- | --- | --- |
| Solubility in distilled water (kg/m$^3$) | 0.034 | 0.106 | 0.245 | 0.512 | 1.470+ | 60 |
| Solubility in simulated deposit water | 0.024 | 0.054 | 0.119 | 0.295 | 0.940 | |

+Empirical value: 1.3

TABLE 10

Improvement in the degree of oil displacement with hot-water flooding

| Substance | none | D | D |
| --- | --- | --- | --- |
| Initial oil volume (m$^3 \cdot 10^{-6}$) | 3.35 | 3.35 | 2.75 |
| Initial oil saturation S$_{oi}$ | 0.88 | 0.875 | 0.88 |
| Initial core temperature (°C.) | 21 | 21 | 21 |
| Flooding temperature (°C.) | 180 | 180 | 180 |
| Transport capacity of the hot water (kg/m$^3$) | — | 32.0 | 32.0 |
| Injection rate (m$^3 \cdot s^{-1} \cdot 10^{-9}$) | 7.67 | 8.83 | 5.72 |
| Front speed (m · s$^{-1} \cdot 10^{-9}$) | 6.54 | 6.67 | 6.94 |
| Calculated substance saturation S$_s$ (% PV) | — | 3.7 | 2.7 |
| Injection volume (PV) | 1.8 | 2.1 | 1.6 |
| Produced oil volume (m$^3 \cdot 10^{-6}$) | 1.13 | 1.5 | 1.30 |
| Residual oil saturation S$_{or}$ | 0.58 | 0.48 | 0.45 |
| Degree of oil displacement E$_d$ | 0.34 | 0.45 | 0.47 |

EXAMPLE 7

Steam flooding of oil-saturated drill cores

The preparation of the drill cores and their saturation with crude oil was carried out as described in Example 5.

Saturated steam of 245° C. was produced by evaporation of deionized water in the fluidized-bed heater of the flooding facility, saturated with the sublimable substance B during the flowing through of the substance tank thermostatically controlled at 245° C., and injected into an oil-saturated drill core. The progression of the temperature front in the deposit was simulated in the way now described. At the start of the flooding test, the drill core installed in a steel tube was outside the heating chamber thermostatically controlled at 245° C. of the flooding facility and had a temperature of 21° C. During the flooding process, the core was slowly pushed at a constant rate into the heating chamber. The temperature front in each case was at the entry of the heating chamber.

The steam flooding test with substance B was repeated in slightly altered conditions. Furthermore, a comparison test without substance B was carried out. The results are compiled in Table 11.

TABLE 11

Steam flooding of oil-satuirated drill cores

| Substance | none | B | B |
| --- | --- | --- | --- |
| Initial oil saturation S$_{oi}$ | 0.87 | 0.91 | 0.87 |
| Initial core temperature (°C.) | 21 | 21 | 21 |
| Flooding temperature (°C.) | 245 | 245 | 245 |
| Transport capacity of the steam (kg/m$^3$) | — | 0.0061 | 0.0061 |
| Injection rate (m$^3$s.$^{-1} \cdot 10^{-9}$) | 20.5 | 21.8 | 23.3 |
| Speed of the steam front (m · s$^{-1} \cdot 10^{-6}$) | 5.56 | 5.83 | 6.67 |
| Calculated substance saturation S$_s$ (% PV) | — | 2.6 | 2.4 |
| Pressure difference after 2.0 PV (bar) | 1.5 | 4.8 | 3.0 |
| Pressure difference after 3.0 PV (bar) | 0.4 | 1.1 | 1.4 |
| Pressure difference after 3.8 PV (bar) | 0.2 | 0.9 | 0.9 |
| Injection volume at steam break-through (PV) | 5.8 | 5.9 | 5.5 |
| Degree of displacement E$_d$ | 0.75 | 0.76 | 0.73 |
| Residual oil saturation S$_{or}$ | 0.22 | 0.22 | 0.24 |

We claim:

1. A process for the enhanced oil recovery of underground mineral oil deposits by selective, reversible reduction of the permeability using hot water flooding at an injection temperature of 150° to 250° C. and/or steam flooding at an injection temperature of 200° to 350° C., wherein hot water and/or steam is injected, at least at times, into the deposit via one or more injection boreholes, as a flooding medium which contains an active amount of one or more substances scarcely oil-soluble at the temperature of the deposit and a water solubility of below 3 kg/m$^3$ water at 20° C. but well soluble or volatile in hot water and/or steam, the melting point of which lies above the temperature of the deposit and which moves with the hot water or the steam through the deposit and which, by precipitation as a solid in an amount of up to 4.3% of the pore volume, temporarily and reversibly constricts the pores of the deposit until flooding medium flowing on after dissolves or evaporates the solid again, which has the overall effect of an areal and vertical equalization of the temperature front.

2. A process as claimed in claim 1, wherein the substance soluble in hot water is 1,5-dihydroxynaphthalene.

3. A process as claimed in claim 1, wherein the substance soluble in hot water is 4,4'-dihydroxybiphenyl.

4. A process as claimed in claim 1, wherein the substance volatile in water vapor is 9,10-anthraquinone.

* * * * *